Figure 1:
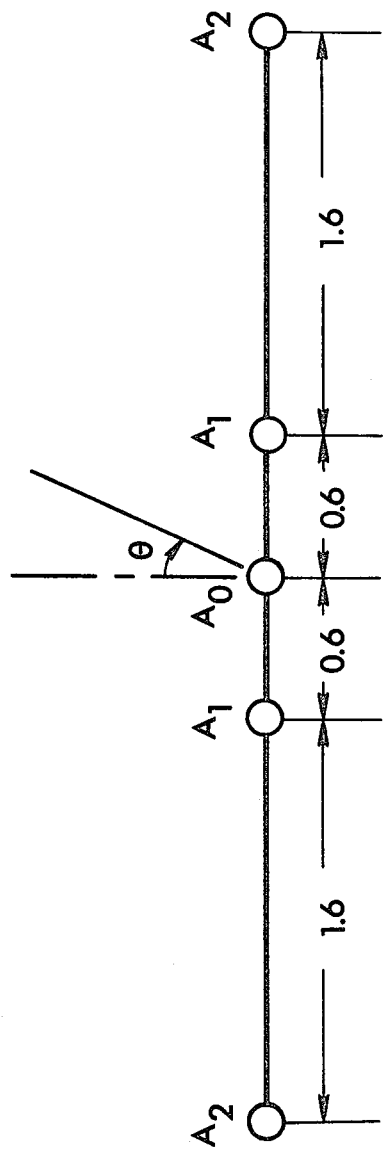

United States Patent

Unz

[11] 4,075,635
[45] Feb. 21, 1978

[54] NONUNIFORMLY OPTIMALLY SPACED ARRAY WITH SPECIFIED ZEROS IN THE RADIATION PATTERN

[76] Inventor: Hillel Unz, c/o Electrical Engineering Department, University of Kansas, Lawrence, Kans. 66045

[21] Appl. No.: 660,627

[22] Filed: Feb. 23, 1976

[51] Int. Cl.² .................................... H01Q 21/08
[52] U.S. Cl. ........................... 343/844; 340/6 R; 343/719
[58] Field of Search ............ 343/844, 854, 719; 340/6 R

[56] References Cited

U.S. PATENT DOCUMENTS

| 3,780,372 | 12/1973 | Unz | 343/844 |
| 3,877,033 | 4/1975 | Unz | 343/844 |

*Primary Examiner*—Eli Lieberman

[57] ABSTRACT

The object of this invention is to provide a method for a new nonuniformly spaced array with nonuniform amplitudes for sonar, seismic and electromagnetic applications, where the optimum positions and the optimum amplitudes of the array elements along its axis are systematically determined in order to produce a radiation pattern with specified zeros (nulls) in the radiation pattern. By specifying the zeros (nulls) of the radiation pattern one controls the beamwidth and the side-lobe level of a directive pattern, and certain other characteristics of other radiation patterns. This method is based on the present invention by which the radiation pattern of a nonuniformly spaced array with nonuniform amplitudes is expressed rigorously by a determinant, where the specified zeros (nulls) of the radiation pattern are introduced explicitly in the determinant in a simple form. Additional zeros (nulls) in the radiation pattern can be introduced implicitly by solving simultaneous equations for the coefficients in the developed determinants. This new invention applies in general to nonsymmetric nonuniformly spaced arrays with nonuniform amplitudes and with any number of elements either even or odd, where (N-1) zeros (nulls) could be specified explicitly for an array of N elements. This invention applies as well after a slight modification to the cases of symmetric nonuniformly spaced arrays with even or odd number of elements. For the particular case of uniformly spaced arrays with nonuniform amplitudes this new invention reduces to the classical polynomial array invented by S. A. Schelkunoff in 1943. This new array will be designated the Nonuniformly Optimally Spaced Array with Specified Zeros, or in short, the NOSA-SZ array.

10 Claims, 1 Drawing Figure

NONUNIFORMLY OPTIMALLY SPACED ARRAY WITH SPECIFIED ZEROS IN THE RADIATION PATTERN

The general idea of the non-uniformly spaced antenna arrays was invented by Unz in 1955, and was publicly proposed and published for the first time in his University of California (Berkeley, 1956) doctoral dissertation, where the first significant work on the subject was reported. From 1960 on, many additional contributions have been made on non-uniformly spaced arrays by numerous authors, and references to most of them may be found in recent books on antennas. However, the main synthesis problem of the non-uniformly spaced arrays, namely, finding the most optimum position of the elements of the array in order to produce a given specified radiation pattern, has not been solved rigorously to date. This is primarily due to the great difficulties in the solution of this highly non-linear problem. The trial and error computer techniques and the other psuedo-optimum synthesis methods suggested so far are of very limited utility, and are almost impossible to employ with arrays of a large number of elements. Thus, the non-uniformly spaced arrays cannot be technically designed at the present time to their full potential advantage, if at all, and therefore, are not generally used.

The first object of this invention is to provide a method by which the radiation pattern with specified zeros (nulls) of a nonuniformly spaced array with nonuniform amplitudes can be expressed rigorously as a determinant, where the specified zeros (nulls) of the radiation pattern are introduced explicitly in the above determinant in a simple form. This new invention, where the radiation pattern is expressed in the form of a determinant, which displays explicitly the zeros (nulls) of the array radiation pattern, allows us to calculate the radiation pattern of a large nonuniformly spaced array with nonuniform amplitudes by using standard computer procedures of developing large determinants. By using this new invention of expressing the radiation pattern in the form of a determinant, the new Nonuniformly Optimally Spaced Array with Specified Zeros (the NOSA-SZ array) could be designed to give a radiation pattern with specified zeros (nulls) in desired specific directions in the visible and/or the invisible region. By doing so one is able to control the radiation pattern within the visible range; one is able, for example, to lower the side-lobe level and/or to narrow the beamwidth of a directive radiation pattern, or otherwise control the radiation pattern in accordance with other specifications. Thus, this method of expressing the radiation pattern with specified zeros (nulls) of a nonuniformly spaced array with nonuniform amplitudes in the form of a determinant, where the zeros (nulls) of the radiation pattern are displayed explicitly in a simple form, in an essential part of this invention.

The second object of this invention is to provide a nonuniformly spaced array with nonuniform amplitudes, where the array elements are distributed in optimum positions along the axis of the array, with reference to the prescribed zeros (nulls) of the radiation pattern of the array, which control the radiation pattern requirements and specifications to a large degree. The optimal distribution of the elements along the axis of the array is determined so that the NOSA-SZ array of this invention will give the best performance in its radiation pattern with the specified and prescribed zeros (nulls) of the radiation pattern. In a directive array a better performance in its radiation pattern means a more optimal performance of its characteristics, such as lower side-lobe level, and/or narrower beamwidth, and/or higher gain, etc. A semi-rigorous synthesis technique is provided for the systematic determination of the optimum positions of the elements and the corresponding amplitudes of the elements in the NOSA-SZ array. While the semi-rigorous technique described later is based on the expression of the radiation pattern with specified zeros (nulls) of the NOSA-SZ array in the form of a determinant, this invention by no means is limited to this particular semi-rigorous technique, and could be extended to other techniques, which are based on the above mentioned expression of the NOSA-SZ array in the form of a determinant, where the zeros (nulls) of the radiation pattern are given explicitly in a simple form. Furthermore, since the NOSA-SZ array is the building block for any number of other more sophisticated arrays, this invention covers all other arrays, where they include in whole or in part the NOSA-SZ array, including, but not limited to the following: Symmetric and nonsymmetric arrays, linear, two or three dimensional arrays, arrays of arrays, scanning arrays and phased arrays, broadband arrays and frequency independent arrays, omni-directional arrays, broadsise arrays, endfire arrays, and many others.

The invention is illustrated by the accompanying drawing in which:

FIG. 1 represents the Nonuniformly Optimally Spaced Array with Specified Zeros (nulls) in the radiation pattern (the NOSA-SZ array) with five elements in a symmetric configuration. All lengths in the array are in terms of half wavelengths ($\lambda/2$). Thus the array has a total length of $2.2\lambda$, where $\lambda$ is the wavelength; the corresponding array elements' distances from the center element are $d_1 = 0.6\ (\lambda/2)$ and $d_2 = 2.2\ (\lambda/2)$. The zeros (nulls) of the radiation pattern of the array in FIG. 1 have been specified a'priori at $u_1 = 120°$ and at $u_2 = 75°$. As a result of the present invention one finds the amplitudes of the elements in FIG. 1 for the above specified zeros (nulls) in the radiation pattern to be:

$$A_0 = -0.4492;\ A_1 = 0.8614;\ A_2 = 0.3981$$

The systematic determination of the optimum positions of the elements in the NOSA-SZ array given in FIG. 1 has been accomplished by using the semi-rigorous synthesis technique for finding the optimum positions of the elements which is described later on.

The radiation pattern $F(\theta)$ of a general linear array with nonuniform spacings of the elements is given by:

$$F(\Theta) = \sum_{p=1}^{N} A_p \exp(ikd_p \sin \Theta) \qquad (1)$$

where $i = \sqrt{-1}$, $k = 2\pi/\lambda$, $\lambda$ being the wavelength, $\theta$ is the angle with the normal to the array axis ($-\pi/2 < \theta \leq +\pi/2$), $d_p$ is the distance of the p-th element of the array with amplitude $A_p$ from the origin, the total number of elements being N.

Equation (1) may be rewritten in the form:

$$F(u) = \sum_{p=1}^{N} A_p \exp(ix_p u) \quad (2)$$

where $u = \pi \sin \theta = 180° \sin \theta \ (-\pi < u \leq +\pi)$ and $x_p = d_p/(\lambda/2)$ gives the distance of the p-th array element from the origin in terms of half wavelengths.

The present invention may be described by the following general principles:

A. The radiation pattern in eq. (2) of a general nonuniformly spaced array of N elements is represented by a determinant of N rows and N columns, with the first row consisting of the N terms $\exp(ix_p u)$ and the other rows consisting of arbitrary complex constants.

B. One is able to specify explicitly a'priori (N-1) zeros (nulls) in the radiation pattern in eq. (2) of a general nonuniformly spaced array of N elements.

C. For each zero (null) $u = u_s$ of the radiation pattern thus specified, one also has to specify explicitly one row of the above mentioned determinant (except the first row) with N elements of the row being in the form $\exp(ix_p u_s)$. The whole determinant will be thus specified by specifying (N-1) zeros (nulls) of the radiation pattern of a nonuniformly spaced array with N elements.

D. Additional number of zeros (nulls) of the radiation pattern may be specified by leaving some of the rows of the determinant with arbitrary constants, these constants to be found by solving the corresponding nonlinear simultaneous equations of the developed determinants, where these additional zeros (nulls) have been specified in the first row of each determinant. The simultaneous equations of the developed determinants will be linear if only the last row has been left with arbitrary constants.

E. One obtains the amplitudes $A_p$ of all the elements of the general nonuniformly spaced array by developing the above determinant along its first row and comparing the finat result with eq. (2) above.

The radiation pattern $F(u)$ of the general nonuniformly spaced array of N elements, in which (N-1) zeros (nulls) of the radiation pattern $u = u_1, u = u_2, u = u_3 \ldots, u = u_{N-1}$ have been explicitly specified a'priori is given in the form of a determinant in accordance with the above general principles as follows:

$$F(u) = \begin{vmatrix} \exp(ix_1 u) & \exp(ix_2 u) & \exp(ix_3 u) & \ldots & \exp(ix_N u) \\ \exp(ix_1 u_1) & \exp(ix_2 u_1) & \exp(ix_3 u_1) & \ldots & \exp(ix_N u_1) \\ \exp(ix_1 u_2) & \exp(ix_2 u_2) & \exp(ix_3 u_2) & \ldots & \exp(ix_N u_2) \\ \exp(ix_1 u_3) & \exp(ix_2 u_3) & \exp(ix_3 u_3) & \ldots & \exp(ix_N u_3) \\ \vdots & \vdots & \vdots & & \vdots \\ \exp(ix_1 u_{N-1}) & \exp(ix_2 u_{N-1}) & \exp(ix_3 u_{N-1}) & \ldots & \exp(ix_N u_{N-1}) \end{vmatrix} \quad (3)$$

From the general theory of determinants it is well known that by developing the determinant in eq. (3) along its first row one will obtain an expression equivalent to the radiation pattern in eq. (2). Furthermore, it is also well known that by choosing in the first row of the determinant in eq. (3) $u = u_1$ in all the terms, the determinant will become zero, since the terms in the first two rows will become identical. By choosing $u = u_2$ in all the terms of the first row of the determinant in eq. (3) the determinant will become zero, since the first row and the third row will become identical in their corresponding terms. Thus the determinant in eq. (3) will become zero by choosing for all the terms of the first row either $u = u_1$ or $u = u_2$ or $u = u_3$ etc. or $u = u_{N-1}$, and these values of $u = u_s$ will be the zeros (nulls) of the radiation pattern $F(u)$ expressed in the form of the determinant in eq. (3). By developing the determinant in eq. (3) along its first row, it can be compared with the radiation pattern in eq. (2) and the amplitudes $A_p$ of the elements can thus be determined. In case the number of the zeros (nulls) of the radiation pattern specified a'priori is less than (N-1) for an array with N elements, certain rows of the determinant in eq. (3) will remain in the form of complex arbitrary constants which will have to be determined using other and additional specifications of the radiation pattern.

For the particular case of uniformly spaced array the determinant in eq. (3) will be reduced to the classical polynomial expressions of A.S. Schelkunoff given by him in 1943. Furthermore, it has been shown in standard texts on determinants that for the uniformly spaced array case, the determinant in eq. (3) can be reduced directly to the factored form of the polynomial epxressions, where the zeros (nulls) of the radiation pattern are given explicitly in accordance with the synthesis method of S. A. Schelkunoff.

For the case of symmetric nonuniformly spaced array with nonuniform amplitudes the radiation pattern expression in eq. (2) will become:

$$F(u) = \sum_{p=0}^{N} A_p \cos(x_p u) \quad (4)$$

where the radiation pattern $F(u)$ in eq. (4) is symmetric. Assuming that the total number of elements of the symmetric nonuniformly spaced array is $(2N+1)$ and the central element is situated at $x_0 = 0$, the corresponding determinantal expression for a symmetric nonuniformly spaced array with an odd number of elements will have the form:

$$F(u) = \begin{vmatrix} 1 & \cos(x_1 u) & \cos(x_2 u) & \cos(x_3 u) & \ldots & \cos(x_N u) \\ 1 & \cos(x_1 u_1) & \cos(x_2 u_1) & \cos(x_3 u_1) & \ldots & \cos(x_N u_1) \\ 1 & \cos(x_1 u_2) & \cos(x_2 u_2) & \cos(x_3 u_2) & \ldots & \cos(x_N u_2) \\ 1 & \cos(x_1 u_3) & \cos(x_2 u_3) & \cos(x_3 u_3) & \ldots & \cos(x_N u_3) \\ \vdots & \vdots & \vdots & \vdots & & \vdots \\ 1 & \cos(x_1 u_N) & \cos(x_2 u_N) & \cos(x_3 u_N) & \ldots & \cos(x_N u_N) \end{vmatrix} \quad (5)$$

where $u = u_1, u = u_2, u = u_3 \ldots u = u_N$ zeros (nulls) have been specified a'priori for the radiation pattern. Thus a total of 2N zeros (nulls) have been specified in the symmetric radiation pattern $F(u)$ for a symmetric nonuniformly spaced array with $(2N+1)$ elements. For the case of a symmetric nonuniformly spaced array with an even number of elements the first column and the last row in the determinantal expression of the radiation pattern in eq. (5) should be eliminated. Thus for the case of an even number of elements one may specify explicitly a total of 2(N-1) zeros (nulls) in the radiation pattern for a symmetric nonuniformly spaced array with 2N elements.

In case one does not specify explicitly all the zeros (nulls) in the radiation pattern as before, one is able to rewrite the determinantal expressions (3) or (5) for the radiation pattern $F(u)$ in an alternative form, with an additional number of arbitrary constants. For the example of a nonuniformly spaced symmetric array with an odd number of elements eq. (5) will be rewritten in the form of a determinant of (N+1) rows and (N+1) columns for any array with (2N+1) elements as follows:

$$F(u) = \begin{vmatrix} 1 & \cos(x_1 u) & \cos(x_2 u) & \ldots & \cos(x_N u) \\ 1 & \cos(x_1 u_1) & \cos(x_2 u_1) & \ldots & \cos(x_N u_1) \\ 1 & \cos(x_1 u_2) & \cos(x_2 u_2) & \ldots & \cos(x_N u_2) \\ \ldots & \ldots & \ldots & & \ldots \\ 1 & C_1 & C_2 & \ldots & C_N \\ 1 & B_1 & B_2 & \ldots & B_N \end{vmatrix} \quad (6)$$

where $B_p$, $C_p$, etc. are abitrary constants to be found. Thus the zeros (nulls) $u=u_1$, $u=u_2$, etc. for the radiation pattern in eq. (6) have been specified explicitly a'priori as before. Additional zeros (nulls) of the radiation pattern $F(u)$ given in the determinantal expression in eq. (6) may be specified as follows. Assuming that the additional zeros (nulls) will be $u=v_1$, $u=v_2$, $u=v_3$, etc., one has to rewrite the determinantal expression (6) several times taking $F(v_1)=0$, $F(v_2)=0$, $F(v_3)=0$ etc. This is accomplished by substituting in the first row in each one of the determinantal expressions the corresponding values $u=v_1$ in the first determinant, $u=v_2$ in the second determinant, $u=v_3$ in the third determinant, etc. Then the determinants will be developed and one obtains several simultaneous equations with several unknowns $B_p$, $C_p$, etc. to be solved for. The constants $B_p$, $C_p$, etc. will be found by solving the several simaltaneous equations which we obtained from the developed determinantal equations (6). In general these simultaneous equations are non-linear expressions in terms of the constants $B_p$, $C_p$, etc. However, in the particular case of only one row of constants, for example $B_p$ only, where the other rows of constants have been prescribed as before by specifying the zeros (nulls) explicitly, one obtains N simultaneous linear equations for the N unknowns $B_p$, where $u=v_1$, $u=v_2$, ... $u=v_N$, have been specified in addition to the zeros (nulls) $u=u_1$, $u=u_2$ ... $u=u_{N-1}$ specified previously. The same approach could be used for the general determinantal expression of the radiation pattern given in eq. (3), except that the constants in that case will be complex in general.

In the example given in FIG. 1, a five element symmetric nonuniformly spaced array with nonuniform amplitudes is considered where the elements positions are taken to be at $x_1 = 0.6$ and $x_2 = 2.2$. The zeros (nulls) of the radiation pattern $F(u)$ are specified and prescribed a'priori at $u_1 = 120°$ and at $u_2 = 75°$. As a result the corresponding terms of the determinantal expression of the radiation pattern in eq. (5) may be found from the following:

$$x_1 u_1 = 72°; x_1 u_2 = 45°; x_2 u_1 = 264°; x_2 u_2 = 165°$$

The determinantal expression (5) of the radiation pattern $F(u)$ may be written in the following form for this case:

$$F(u) = \begin{vmatrix} 1 & \cos(x_1 u) & \cos(x_2 u) \\ 1 & \cos(x_1 u_1) & \cos(x_2 u_1) \\ 1 & \cos(x_1 u_2) & \cos(x_2 u_2) \end{vmatrix} = \begin{vmatrix} 1 & \cos(x_1 u) & \cos(x_2 u) \\ 1 & \cos 72° & \cos 264° \\ 1 & \cos 45° & \cos 165° \end{vmatrix} =$$

$$= \begin{vmatrix} 1 & \cos(x_1 u) & \cos(x_2 u) \\ 1 & 0.3090 & -0.1045 \\ 1 & 0.7071 & -0.9659 \end{vmatrix} \quad (7a)$$

and by developing the determinant in eq. (7a) one obtains:

$$F(u) = -0.2246 + 0.8614 \cos(x_1 u) + 0.3981 \cos(x_2 u) \quad (7b)$$

From the result in eq. (7b) one obtains the corresponding amplitudes of the five element symmetric nonuniformly spaced array given in FIG. 1 as follows:

$$A_0 = 2(-0.2246) = -0.4492; A_1 = 0.8614; A_2 = 0.3981$$

The amplitude of the element at the center $x_o=0$ is doubled, since in the symmetric array it can be looked upon as if one has two distinct elements at both sides of the origin $x_0=0$, both of them very close to it, so that they become superimposed on each other.

Thus by using the above determinantal expressions for the radiation pattern one is able to design a nonuniformly optimally spaced array with nonuniform amplitudes with specified and prescribed zeros (nulls) in specific directions for the corresponding radiation pattern. By specifying the zeros (nulls) of the radiation pattern before hand, one is able to control the half-power beamwidth, the between nulls beamwidth, and/or the sidelobe level, and/or the scanning range, and/or other specific characteristics of the radiation pattern, in quite a similar manner as was done by S. A. Schelkunoff for the particular case of the uniformly spaced array. One is able to control the radiation pattern characteristics by concentrating the zeros (nulls) of the radiation pattern in the visible range, or spreading them equally in the visible range, and/or spreading the zeros equally or unequally in the visible and the non-visible range. Essentially by specifying the directions of the zeros (nulls) of the radiation pattern for the nonuniformly spaced array by using the present invention and its corresponding determinantal expressions for the radiation pattern, one controls the behavior of the radiation pattern. By using the determinantal expressions for the radiation pattern of the present invention the nonuniformly spaced array could be designed to give zeros (nulls) in the corresponding radiation pattern in desired specific directions in the visible and the invisible region. By controlling the distribution of the zeros (nulls) of the radiation pattern in specific directions, one is able to control the other parameters and characteristics of the radiation pattern of the nonuniformly spaced array with nonuniform amplitudes, for example, its side-lobe level, its beamwidth, its gain, etc.

The semi-rigorous technique for finding the optimum positions of the elements of the NOSA-SZ array of the present invention is as follows. A first set of zeros (nulls) in the radiation pattern is chosen in specific directions, and the radiation pattern $F(u)$ is calculated for a specific nonuniformly spaced array by using the determinantal expressions of the present invention. By keeping the specified zeros (nulls) of the radiation pattern as before, one calculates the radiation pattern $F(u)$ for the nonuniformly spaced array, taking the elements of the array to be located in several other positions. A large number of different possibilities for the positions of the elements are calculated for the same given zeros (nulls) of the radiation pattern, and the corresponding radiation pattern $F(u)$ in each case if found, by using a high speed computer, which can calculate and move the elements to the different positions authomatically. The radiation pattern for each case is drawn, with all of them having the same zeros (nulls) in the same specific directions as specified. Thus the best radiation pattern and its corresponding nonuniformly spaced array can be determined in accordance with the required characteristics of the radiation pattern. The next step will be to choose another set of specified zeros (nulls) in the radiation pattern, by studying the radiation pattern found so far, and repeat the process. For example, if the side-lobe level found for the radiation pattern so far is too high for the required characteristics of the radiation pattern as prescribed, the new set of zeros (nulls) of the new radiation pattern are chosen so that they are closer to each other, so that the side-lobe level will become smaller in the next try, until the specified side-lobe level will be reached. If the scanning range is too limited in another example, one distributes the new set of specified zeros (nulls) in the radiation pattern in the invisible range in order to increase that scanning range in the next try. For all these calculations one might take the same first zero (null) near the main beam, since it determines the between-nulls beamwidth, but choose the other zeros (nulls) so specified to be closer and closer to each other in order to decrease the side-lobe level, until the specified side-lobe level is reached. In many cases one could distribute the zeros (nulls) specified for the radiation pattern equally in the visible region, depending on the required characteristics, while in other cases the distances should vary in accordance with the specifications of the radiation pattern. Usually, the closer the zeros (nulls) specified for the radiation pattern, the smaller the side-lobe levels between them. In each case of a new set of specified zeros (nulls) of the radiation pattern, the radiation patterns of a large number of arrays with different positions of the elements are calculated by a high speed computer, by using the determinantal expressions for the radiation pattern of the present invention, and the best radiation pattern $F(u)$ in accordance with its specified characteristics, and its corresponding optimum positions of the corresponding NOSA-SZ array is chosen. As one gains more experience, the number of the trial and error calculations of the different cases becomes smaller and smaller. The same procedure will also apply to the case of a scanning nonuniformly spaced array, except that one is also required to control the specified zeros (nulls) of the radiation pattern in this case in the invisible region. By using the determinantal expressions of the present invention one is able to design the Nonuniformly Optimally Spaced Array with Specified Zeros (nulls) in the radiation pattern which will be superior in performance to the classical DolphTchebysheff uniformly spaced array, or design the NOSA-SZ array which will have a wider scanning range than the corresponding uniformly spaced array. Furthermore, general mathematical theorems which apply to determinants and matrices could be used in order to develop the design and the theory of the present invention of the NOSA-SZ array and thus develop this invention further. Thus, while the design of the particular case of the uniformly spaced array in accordance with the invention by S. A. Schelkunoff in 1943 is based on the study of complex polynomials and their roots, the design of the general nonuniformly spaced array in accordance with the present invention by H. Unz is based on the study of complex and real determinants and matrices and their roots, and the case of the uniformly spaced array becomes just a very particular case of the present invention.

Since the Nonuniformly Optimally Spaced Array with Specified Zeros (nulls) in the radiation pattern (the NOSA-SZ array) described in the foregoing specifications could be used as the basis for building more sophisticated arrays with specific or minimax performance indices requirements, this invention covers, but is not limited to, arrays with specific requirements on the radiation pattern, side-lobe level, beamwidth, impedance, bandwidth, mutual coupling, gain, directivity, polarization, noise temperature, signal to noise ratio, interference ratio, and any other specific indices, if the array includes in whole or in part certain definitive aspects of this invention as a part of its analysis or synthesis. This invention also covers this array, when the elements used in the array are of different types, including but not limited to, dipoles, slots, horns, apertures, parabolic reflectors, dishes, and many others. This invention also covers this array when it is used for all different purposes. Many of the design techniques in prior art developed for electromagnetic arrays can and have been applied with modifications to acoustic arrays, seismic arrays and arrays in other fields. Thus, this invention described in the foregoing specifications covers, but is not limited to, all such arrays or combinations of them in other fields for any purpose. This invention is suitable for acoustic (sonar) arrays and seismic arrays where the number of array elements per wavelength requirements is relatively large. This invention covers the NOSA-SZ acoustic arrays and sonar arrays, used with acoustic elements of any type, when used under water or above water, for whatever purpose. This invention covers the NOSA-SZ seismic arrays, used with seismic elements, geophones, seismometers, seismographs or other elements, when used underground or above ground for whatever purpose. Thus, the foregoing invention of the NOSA-SZ array covers any array of any shape and size, and used with any kind of elements for any purpose, provided that the invention described here will be used there in whole or in part, or will be used there as a part of its analysis or synthesis during the design procedure.

While in the foregoing specification, I have set forth certain details of the Nonuniformly Optimally Spaced Array with Specified Zeros (the NOSA-SZ array) and its semi-rigorous synthesis technique, for the purpose of illustrating one mode of the invention, it will be understood that such details may be varied widely by those skilled in the art without departing from the spirit of my invention, and it is therefore aimed to cover all such changes and modifications in all areas of endeavor where arrays are used, as fall within the true spirit and scope of this invention.

What I claim is:

1. A method of synthesis for controlling the radiation pattern of a general linear nonuniformly spaced array with nonuniform amplitudes by specifying the zeros (nulls) of the radiation pattern explicitly, said method based on the following rigorous relationship which expresses the array radiation pattern ($Fu$) of an array of N elements by a determinant of N rows and N columns, with the first row consisting of N terms $\exp(ix_p u)$, and each subsequent row consisting of N terms $\exp(ix_p u_s)$, $u_s$ being identical in the terms of each row and represents explicitly the zero (null) of the array radiation pattern $F(u)$, the total number of zeros (nulls) so specified equal to (N-1), with N being the number of the elements of the array, where $u = \pi \sin \theta$ θ being the angle with the normal to the array axis, $x_p$ is the distance of the p-th array element from the reference origin in terms of half wavelength ($\lambda/2$), $A_p$ is the amplitude of each corresponding element of the array to be found by developing the above mentioned determinant along its first row and identifying the amplitude of each element at position $x_p$ as the factor multiplying the corresponding term $\exp(ix_p u)$.

2. The same method of synthesis as in claim 1, with the exception that the last row of the determinant, or any number of additional rows, will be replaced by arbitrary complex constants, to be found by a solution of simultaneous equations of several developed determinants, where additional number of zeros (nulls) of the radiation pattern $F(u)$, such that $F(v_1)=0$, $F(v_2)=0$, $F(v_3)=0$ etc., have been specified in the first row of each determinant.

3. A method of synthesis as in claim 1 for controlling the radiation pattern of a linear symmetric nonuniformly spaced array with nonuniform amplitudes and odd number of elements by specifying the zeros (nulls) of the array radiation pattern explicitly, said method based on the following rigorous relationship which expresses the array radiation pattern $F(u)$ of an array of (2N+1) elements as in claim 1 by a determinant of (N+1) rows and (N+1) columns, with the first row consisting of (N+1) terms $\cos(x_p u)$, and each subsequent row consisting of (N+1) terms $\cos(x_p u_s)$, $u_s$ being identical in the terms of each row and represents explicitly the zero (null) of the array radiation pattern $F(u)$, the total number of zeros (nulls) so specified is equal to N, where one has a total of 2N zeros (nulls) specified in the symmetric radiation pattern $F(u)$ of the symmetric array of (2N+1) elements, where $x_p$ is the distance of the p-th array element in terms of half wavelength ($\lambda/2$) from the center element of the symmetric array situated at $x_0=0$, with only the elements of one side of the symmetric array and the center element to be used as terms in the above mentioned determinant.

$A_p$ is the amplitude of each element of the symmetric array to be found by developing the above mentioned determinant along its first row and identifying the amplitude of each element at position $x_p$ as the factor multiplying the corresponding term $\cos(x_p u)$, with the exception of the center element whose amplitude should be doubled.

4. A method of synthesis as in claim 1 for controlling the radiation pattern of a linear symmetric nonuniformly spaced array with nonuniform amplitudes and even number of elements by specifying the zeros (nulls) of the array radiation pattern explicitly, said method based on the following rigorous relationship which expresses the array radiation pattern $F(u)$ of an array of 2N elements as in claim 1 by a determinant of N rows and N columns, with the first row consisting of N terms $\cos(x_p u)$, and each subsequent row consisting of N terms $\cos(x_p u_s)$, $u_s$ being identical in the terms of each row and represents explicitly the zero (null) of the array radiation pattern $F(u)$, the total number of zeros (nulls) so specified is equal to (N−1), where one has a total of 2(N−1) zeros (nulls) specified in the symmetric radiation pattern $F(u)$ of the symmetric array of 2N elements, where $x_p$ is the distance of the p-th array element in terms of half wavelength ($\lambda/2$) from the center of the symmetric array, with only the elements of one side of the symmetric array to be used as terms in the above mentioned determinant, $A_p$ is the amplitude of each element of the symmetric array to be found by developing the above mentioned determinant along its first row and identifying the amplitude of each element at position $x_p$ as the factor multiplying the corresponding term $\cos(x_p u)$.

5. The same method of synthesis as in claim 1, with the exception that for the linear symmetric nonuniformly spaced array with nonuniform amplitudes the first row of the determinant will consist of the terms $\cos(x_p u)$, and each subsequent row of the determinant will consist of the terms $\cos(x_p u_s)$, and with the exception that the last row of the determinant, or any number of additional rows, will be replaced by arbitrary constants, to be found by a solution of simultaneous equations of several developed such determinants, where additional number of zeros (nulls) of the radiation pattern $F(u)$, such that $F(v_1)=0$, $F(v_2)=0$, $F(v_3)=0$, etc., have been specified in the first row of each determinant.

6. A method of synthesis for controlling the side-lobe level and/or the beamwidth of the directive radiation pattern $F(u)$ of a symmetric or nonsymmetric nonuniformly spaced array with nonuniform amplitudes, said method based on specifying the set of zeros (nulls) of the array radiation pattern $F(u)$ as in claim 1, and calculating the radiation pattern $F(u)$ for the optimum positions $x_p$ of the array elements as in claim 1, where the determination of the specified zeros (nulls) of the radiation pattern and the corresponding optimum positions of the array elements will be done by a semi-rigorous trial-and-error approach, of calculating the radiation pattern $F(u)$ for several different cases of specified zeros (nulls) and given element positions and choosing the best result of the different cases, said result will depend also on the phased array scanning angle requirement and the other specified parameters of the array and its radiation pattern.

7. An arrangement of a set of elements in a nonuniformly optimally spaced array with nonuniform amplitudes, as specified in claim 1, in which each element is an electromagnetic antenna, radiator or receiver, like dipole, slot, horn, aperture, dish, parabolic reflector, etc. or a combination of them.

8. An arrangement of a set of elements in a nonuniformly optimally spaced array with nonuniform amplitudes, as specified in claim 1, in which each element is an acoustic or sonar radiator or receiver, or a combination of them, used under water or above water.

9. An arrangement of a set of elements in a nonuniformly optimally spaced array with nonuniform amplitudes, as specified in claim 1, in which the element is a seismic radiator or receiver, like geophone, seismometer, seismograph, etc. or a combination of them, used under ground or above ground.

10. An array comprising a grouping of sub-arrays, each designed in accordance with the method set out in claim 1.

* * * * *